United States Patent

Wu

[11] Patent Number: 6,134,927
[45] Date of Patent: Oct. 24, 2000

[54] COVERING LOCK FOR AN AUTOMOBILE STEERING WHEEL

[76] Inventor: Wen-Yin Wu, 8F-2, No. 22, Chung Cheng 2 Rd., Kaohsiung City, Taiwan

[21] Appl. No.: 09/305,980

[22] Filed: May 5, 1999

[51] Int. Cl.[7] .................................................. B60R 25/02
[52] U.S. Cl. ............................................. 70/209; 70/226
[58] Field of Search .............................. 70/209, 211, 212, 70/225, 226, 237, 238

[56] References Cited

U.S. PATENT DOCUMENTS

| | | | |
|---|---|---|---|
| 5,031,429 | 7/1991 | Wang | 70/209 |
| 5,275,030 | 1/1994 | Cole | 70/209 |
| 5,353,614 | 10/1994 | Anderson | 70/209 |
| 5,454,240 | 10/1995 | Whitney | 70/209 |
| 5,540,067 | 7/1996 | Kim | 70/209 |
| 5,595,078 | 1/1997 | Harrell | 70/209 |
| 5,605,063 | 2/1997 | Taurog | 70/209 |
| 5,613,384 | 3/1997 | Weber et al. | 70/209 |
| 5,666,832 | 9/1997 | Cunningham | 70/209 |
| 5,676,001 | 10/1997 | Ho | 70/209 |
| 5,735,150 | 4/1998 | Desouza | 70/209 |
| 5,755,122 | 5/1998 | Higginson | 70/209 |
| 5,782,116 | 7/1998 | Ryan et al. | 70/209 |
| 5,842,360 | 12/1998 | Somerfield | 70/209 |
| 5,868,016 | 2/1999 | Duran, Sr. | 70/209 |
| 5,875,661 | 3/1999 | Ho | 70/209 |
| 5,906,122 | 5/1999 | Jinn-Fu | 70/209 |
| 5,992,190 | 11/1999 | Townsend | 70/209 |
| 5,996,721 | 12/1999 | Winner | 70/209 |

*Primary Examiner*—Darnell Boucher
*Attorney, Agent, or Firm*—Pro-Techtor International Services

[57] ABSTRACT

A covering lock for an automobile steering wheel includes a cover and an anti-theft rod. The cover has a circumferential U-shaped hook to hook around the steering wheel of a car and the anti-theft rod able to be locked with the cover and extending rearward to prevent the steering wheel from rotated. Then the covering lock not only locks the steering wheel but also prevents a safety air bag fixed on the steering wheel from stolen.

2 Claims, 5 Drawing Sheets

COVERING LOCK FOR AN AUTOMOBILE STEERING WHEEL

BACKGROUND OF THE INVENTION

This invention relates to a covering lock for an automobile steering wheel, particularly to one having a cover fitting and hooking on the steering wheel and a anti-theft rod fixed to extend to the rear direction of the cover, consisting of few components, easy to handle, and at the same time preventing a safety air bag from stolen.

Automobile steering locks have been widely used and many kinds of different structures and designs are in market for consumers to choose. The main object of a automobile steering lock is to prevent the steering wheel from rotating. Some locks have a long rod extending from the steering wheel to preventing it from rotated, some prevent the steering wheel and the brake step at the same time, and some prevent the steering wheel and the hand brake from moved at the same time to attain the object. Further, a safety air bag is attached to the steering wheel of new automobiles, so it may be stolen in case of difficulties of breaking the steering lock, losing not a few expense for the safety air bag.

There is a steering lock disclosed in a patent application publicized in No. 279420, consisting of two half covers having a center hole for pivotally connected to each other to become a circular or overlapped cover covered on the steering wheel of an automobile. Each half cover has a position hole for a lock and a hook of an elongate shrinkable rod to lock on the steering wheel. This case also includes two half covers and a traditional steering lock, which is usually stored in the trunk of a car when not in use and taken out for use to prevent the steering wheel from rotated and the safety air bag from stolen at the same time. But in handling to lock the steering wheel, the position holes of the two half covers should be aligned before the two side hooks of a traditional steering lock can be hooked on the steering wheel, resulting in difficult handling and a high cost.

SUMMARY OF THE INVENTION

This invention has been devised to offer a kind of covering lock for an automobile steering wheel, having an anti-theft rod extending rearward from a circular cover, having few components, easy to handle, and preventing the safety air bag from stolen at the same time.

The main feature of the invention is a circular cover covering and hooking on the steering wheel, and an anti-theft rod able to be locked with the cover and to extend rearward from the cover to hamper the steering wheel from rotated.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
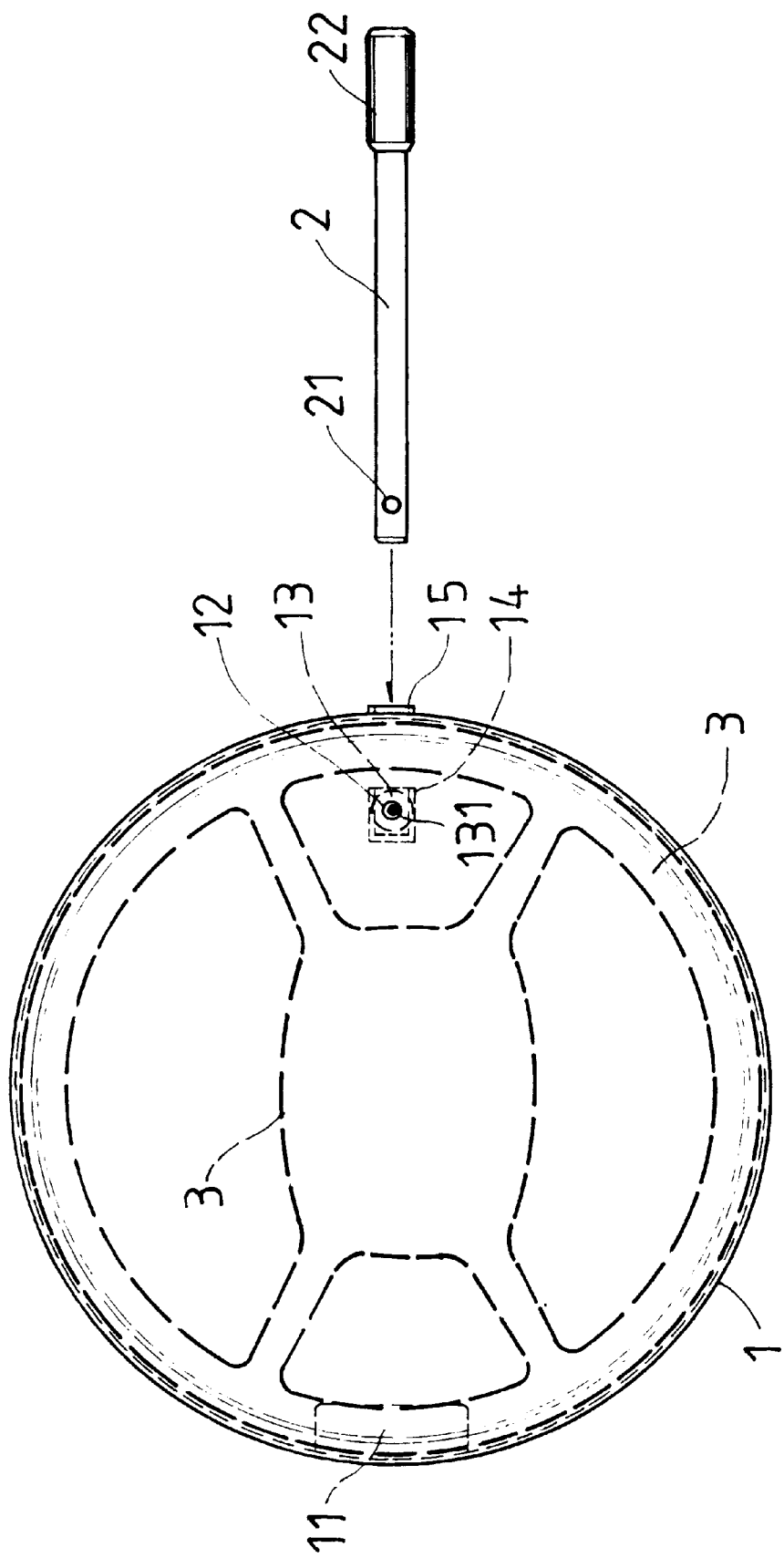
FIG. 1 is an upper view of a first embodiment of a covering lock for an automobile steering wheel in the present invention.
Figure 2:
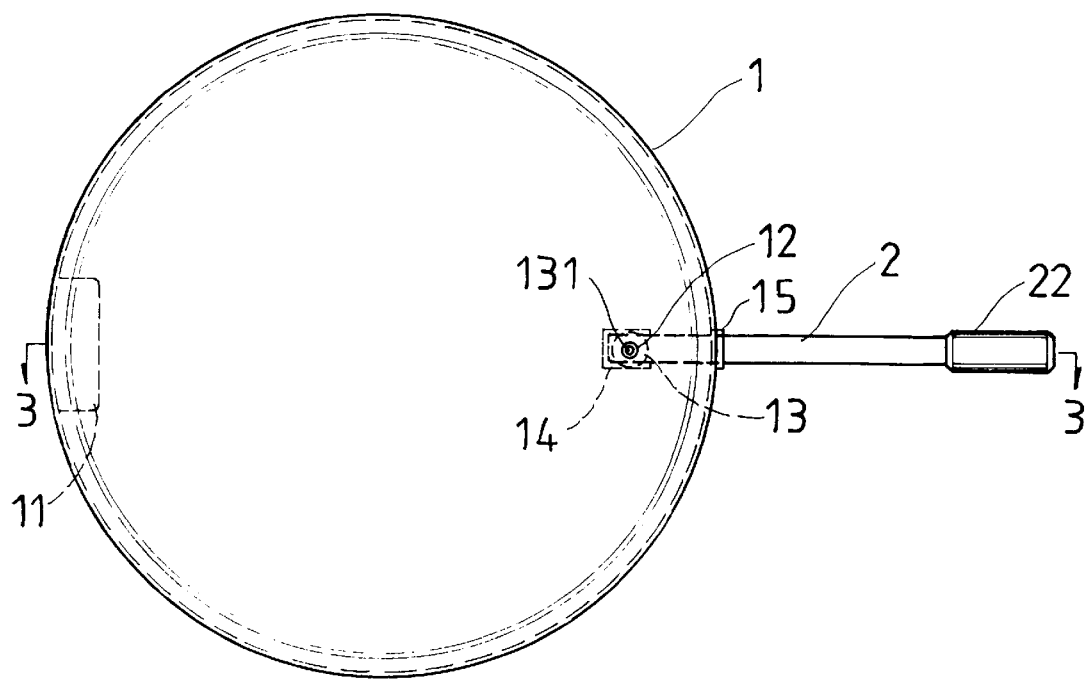
FIG. 2 is an upper view of the covering lock for an automobile steering wheel in the present invention, showing it being in a locked condition.
Figure 3:
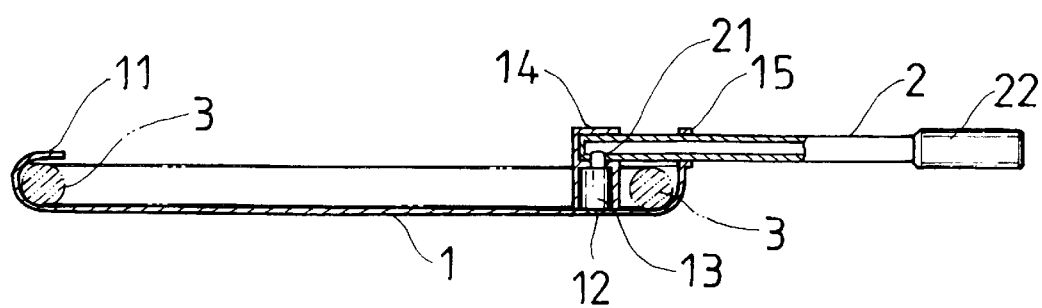
FIG. 3 is a cross-sectional view of line 3—3 in FIG. 2.

A first embodiment of a covering lock for an automobile steering wheel in the present invention, as shown in FIGS. 1, 2 and 3, includes a circular cover 1 to be covered on the steering wheel 3 of a car, an elongate anti-theft rod 2, and a lock 13 as main components.

The circular cover 1 has a circumferential U-shaped hook 11 to hook on an outer edge of the steering wheel of an automobile, as shown in FIG. 3, a dead bolt hole 12 bored near the U-shaped hook 11 for a dead bolt hole of a lock 13 to expose so that the lock 13 may hide in the cover 1 to prevent it from being pried unlocked, a position cylinder 14 fixed on a lower side near the U-shaped hook 1 and containing a lock 13 therein and having a hole for the free end of the anti-theft rod 2 to extend therein to be locked by the lock 13. The circular cover 1 further has a sleeve 15 fixed on an outer edge of the circumferential U-shaped hook 11 opposite and in line to the position cylinder 14 for the anti-theft rod 2 to pass through to reach the cylinder 14.

The anti-theft rod 2 has one end formed into a grip 22 for handling, one or more dead bolt holes 21 formed in the other end for a dead bolt of the lock 13 to engage one of them so as to prevent the rod 2 from pulling out after the lock 13 is locked.

In using the first embodiment of the covering lock, referring to FIGS. 1, 2 and 3, the cover 1 is placed on the steering wheel 3 of a car, with the circumferential U-shaped hook 11 hooking around the outer edge of the wheel body 3, and then the anti-theft rod 2 is inserted through the sleeve 15 and in the cylinder 14, with the lock 13 being hidden and locked to let its head bolt protruding out to engage one of the dead bolt hole 21 of the anti-theft rod 2, which is then hampered from pulling out of the cover 1 to prevent the steering wheel from rotated.

Figure 4:
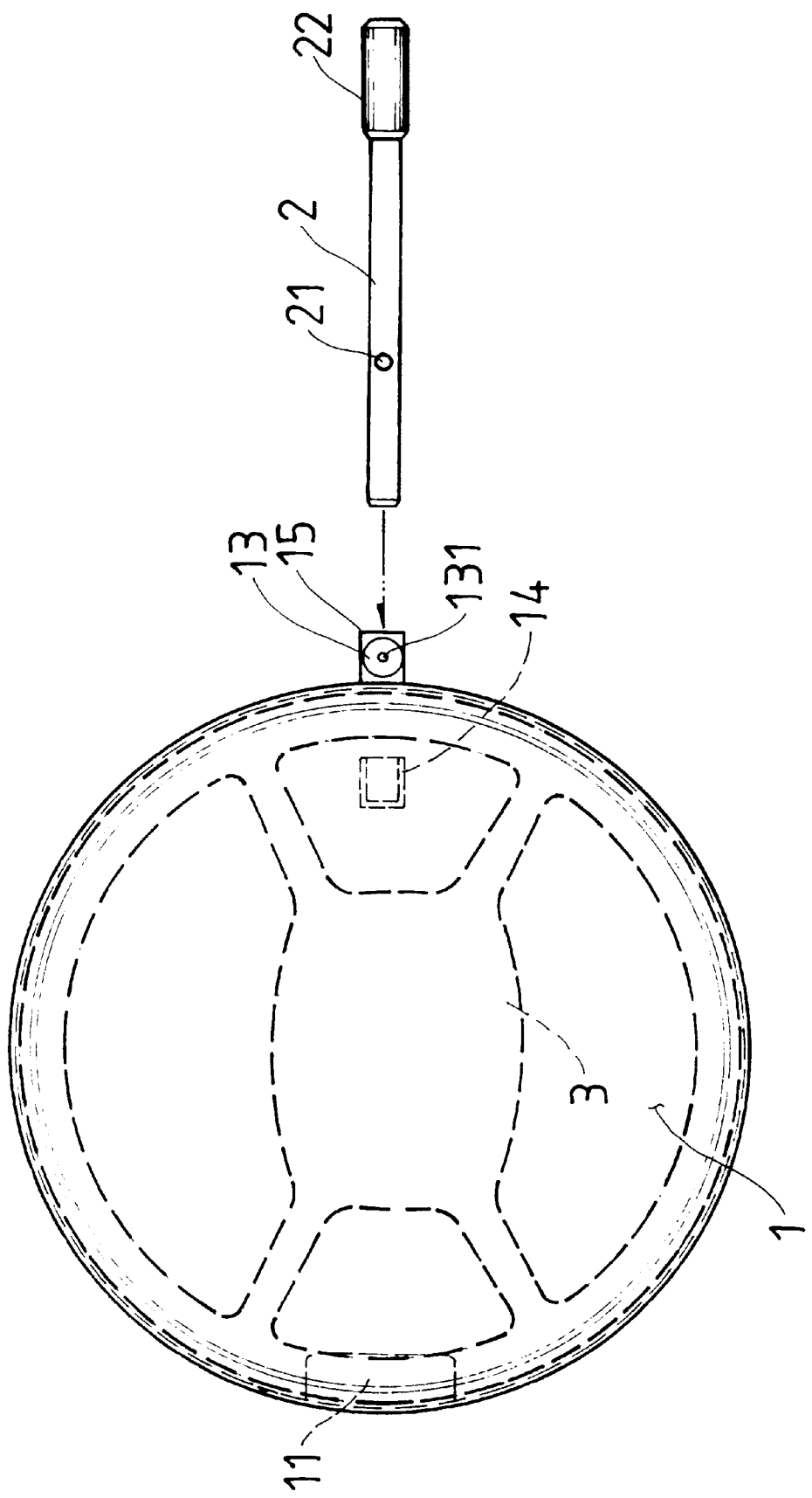
FIG. 4 is an upper view of a second embodiment of a covering lock for an automobile steering wheel in the present invention.
Figure 5:
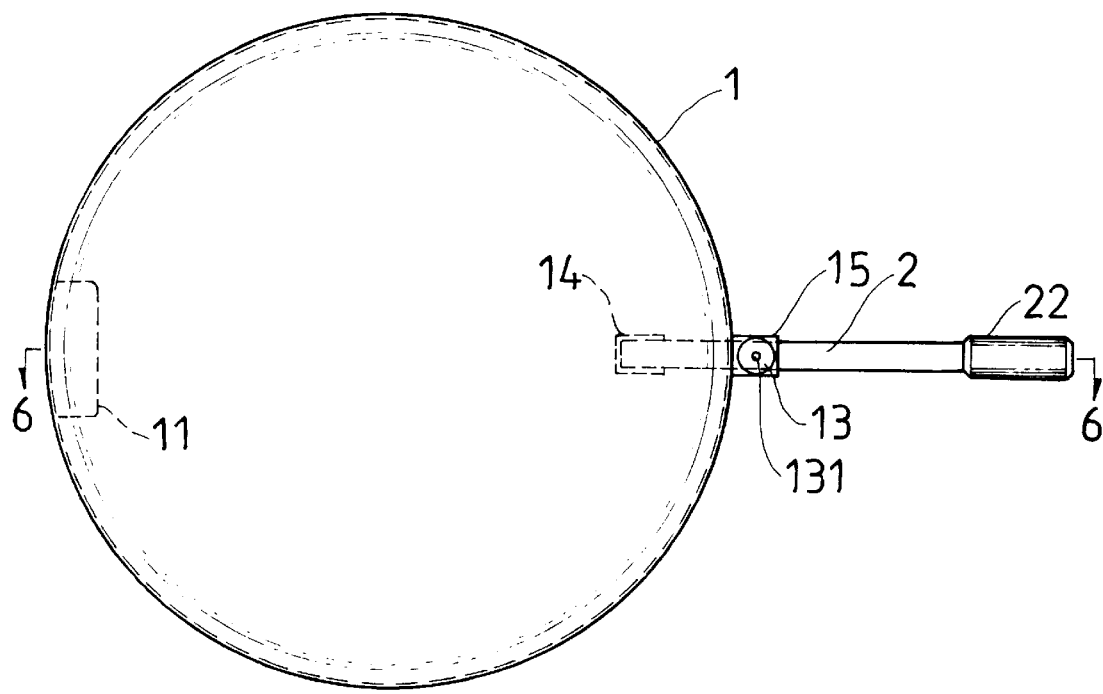
FIG. 5 is an upper view of the second embodiment of a covering lock for an automobile steering wheel in the present invention, showing it being in a locked condition.
Figure 6:
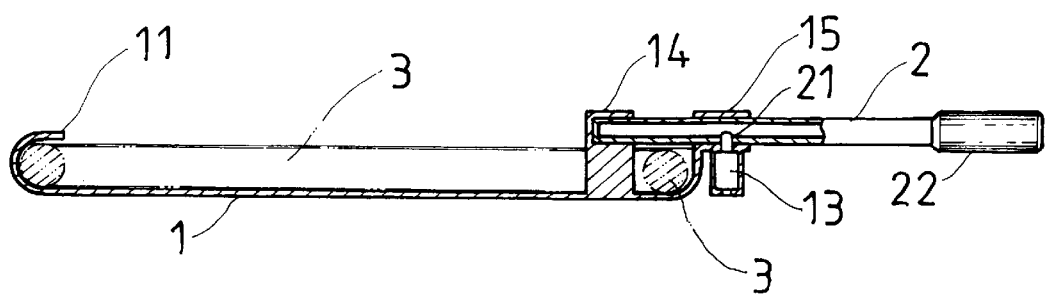
FIG. 6 is a cross-sectional view of line 6—6 in FIG. 5.
Figure 7:
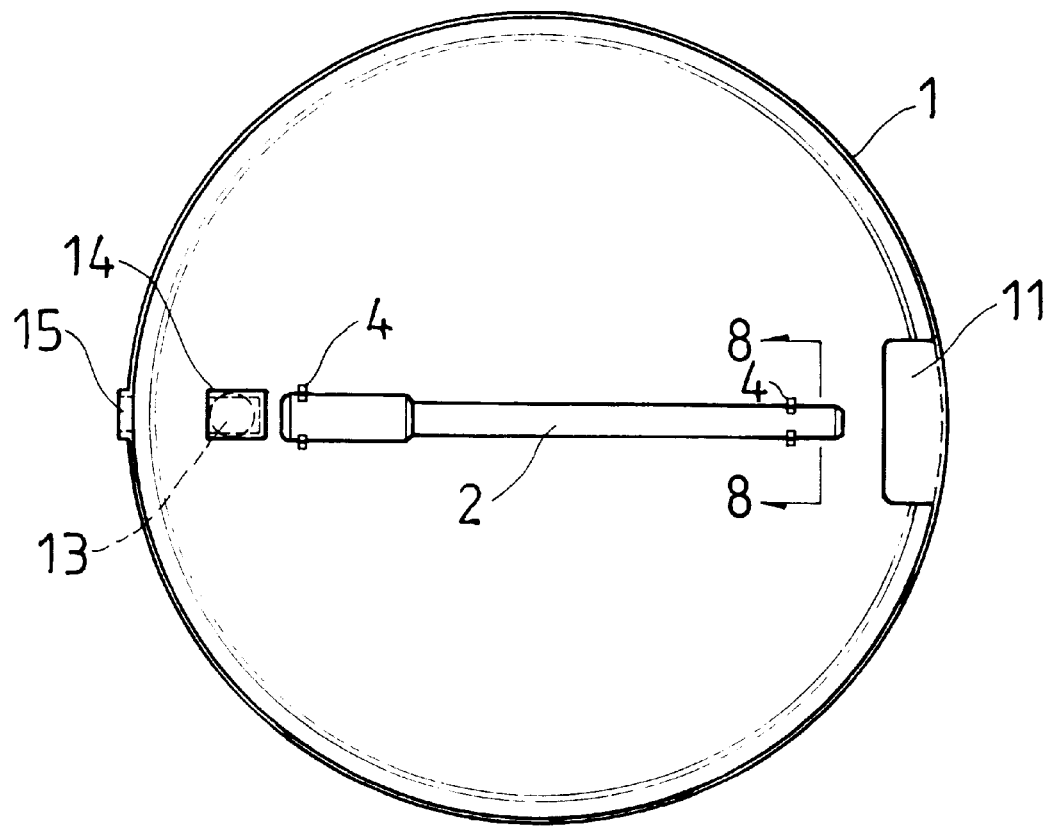
FIG. 7 is an upper view of the second embodiment of a covering lock for an automobile steering wheel in the present invention, showing the anti-theft rod collapsed; and, FIG. 8 is a cross-sectional view of line 8—8 in FIG. 7.
Figure 8:
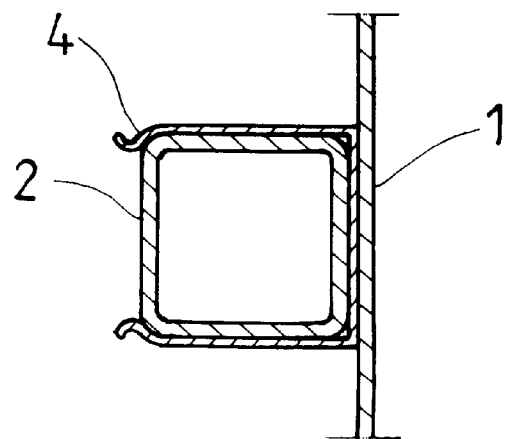

FIGS. 4, 5 and 6 show a second embodiment of a covering lock for an automobile steering wheel, having the same structure except the position of the lock 13, which is fixed in the sleeve 15, not in the anti-theft rod 2 as the first embodiment.

In using the second embodiment, the cover 1 is placed on the steering wheel 3 of a car, with the anti-theft rod 3 being inserted through the sleeve 15 and then in the cylinder 14. Then the lock 13 is locked to let its dead bolt to extend out to engage one of the dead bolt hole 21 of the anti-theft rod 3, quickly finishing locking this lock on the steering wheel.

Further, the cover 1 may be provided with two pairs of clamps 4 for putting away and securing the anti-theft rod 2 during when it is not used.

While the preferred embodiments of the invention have been described above, it will be recognized and understood that various modifications may be made therein and the appended claims are intended to cover all such modifications which may fall within the spirit and scope of the invention.

What is claimed is:

1. A covering lock adapted for a steering wheel comprising:

a cover and an anti-theft rod;

said cover having a circumferential U-shaped hook that receives an outer edge of the steering wheel, said cover further having a dead bolt hole near said circumferential U-shaped hook, a position cylinder being fixed on a lower side of said cover under said dead bolt hole, a lock fixed inside said position cylinder with its dead bolt facing said dead bolt hole of said cover, a sleeve fixed on an outer edge of said circumferential U-shaped hook aligned with said cylinder, said sleeve having a center hole for said anti-theft rod to pass through and enter an interior of said position cylinder, said anti-theft rod having one or more dead bolt holes in its free end, said anti-theft rod and said cover securing the steering wheel therebetween when said anti-theft rod is inserted in said sleeve and said position cylinder; and wherein two pairs of clamps are further provided on said lower side of said cover for storing said anti-theft rod when said anti-theft rod is not in use.

2. A covering lock adapted for an automobile steering wheel comprising:

a cover and an anti-theft rod:

said cover having a circumferential U-shaped hook, a position cylinder fixed on a lower side of said cover near said circumferential U-shaped hook, a sleeve fixed on an outer edge of said circumferential U-shaped hook near and in line with said position cylinder for said anti-theft rod to pass through and be secured by a lock contained in said sleeve, said cover and said anti-theft rod receiving said steering wheel after said anti-theft rod is inserted and locked by said lock, said anti-theft rod having at least one dead bolt hole to receive a dead bolt of said lock; and wherein two pairs of clamps are further provided on said lower side of said cover for storing said anti-theft rod when said anti-theft rod is not in use.

* * * * *